United States Patent [19]

Negami et al.

[11] Patent Number: 4,977,227

[45] Date of Patent: Dec. 11, 1990

[54] LIGNOSULFONIC GRAFT COPOLYMER AS A CEMENT DISPERSANT

[75] Inventors: Shin'ichi Negami, Gotenba; Hiroshi Nomachi; Toru Nemoto, both of Chigasaki; Yoshio Tanaka, Komae; Akira Ohta, Chigasaki, all of Japan

[73] Assignee: Sandoz Ltd., Basle, Switzerland

[21] Appl. No.: 276,727

[22] Filed: Nov. 28, 1988

[30] Foreign Application Priority Data

Dec. 1, 1987 [JP] Japan .................................. 62-301432

[51] Int. Cl.⁵ .......................... C08H 5/02; C09K 7/00; C09D 4/00
[52] U.S. Cl. .................................... 527/400; 523/131; 106/823
[58] Field of Search ........................ 527/400; 523/131; 106/314

[56] References Cited

U.S. PATENT DOCUMENTS

| | | | |
|---|---|---|---|
| 3,784,493 | 1/1974 | Giguere et al. | 527/400 |
| 4,276,077 | 7/1981 | Zaslavsky et al. | 527/400 |
| 4,387,205 | 7/1983 | Zaslavsky et al. | 527/400 |

FOREIGN PATENT DOCUMENTS 2121629  6/1987  Japan ................... 527/400

*Primary Examiner*—Nathan M. Nutter
*Attorney, Agent, or Firm*—Gerald D. Sharkin; Robert S. Honor; Walter F. Tewell

[57] ABSTRACT

This invention provides a cement dispersant of a lignosulfonic acid graft copolymer, obtained by a redox free radical reaction of lignosulfonic acid or its salts with one or more acrylic or vinylic monomers containing functional groups, in an aqueous solution in the presence of a radical initiator, e.g, redox catalyst. The lignosulfonic acid graft copolymer has a molecular weight distribution of from $5 \times 10^2$ to $5 \times 10^6$.

4 Claims, 1 Drawing Sheet

LIGNOSULFONIC GRAFT COPOLYMER AS A CEMENT DISPERSANT

The present invention relates to cement dispersants. More particularly, the invention relates to cement dispersants as water reducing and slump loss reducing agents for cement compositions, e.g., cement paste, cement mortar and concrete.

BACKGROUND OF THE INVENTION

Lignosulfonic acid (LSA) is a most common cement dispersant. When used in cement compositions LSA reduces the amount of water used, and improves the workability of the cement compositions. However, LSA has the defect of lowering the flowability (slump) of the cement compositions over time.

Furthermore, as the dosage is increased, the calcium salt of LSA causes increases in air entrainment and an overly retarded curing time, in cement compositions.

To cure the defects of the LSA salt the following procedures have been used:
1—Alkali air oxidation of LSA (Japanese Kokai Sho-No. 55-56051);
2—Elimination of the low molecular weight region of LSA by ultrafiltration (GB No. 2092564);
3—Reduction in the low molecular weight region of LSA by ultrafiltration of co-condensates of LSA with naphthalenesulfonic acid and formaldehyde (Japanese Kokai Sho-No. 58-176158); and
4—Converting LSA to a high polymer with hydrogen peroxide, persulfate or the like (Japanese Kokoku Sho-No. 62-103).

However, these methods have either been economically disadvantageous, or have produced low yields of the product.

Prior art processess for preparing lignosulfonic acid graft copolymers include:
(a) Preparing a graft copolymer of acrylic acid with a LSA salt using hydrogen peroxide (U.S. Pat. No. 4,322,301). This copolymer has been used for sludge dispersion stabilizers for excavation of oil fields; and
(b) Preparing a graft copolymer of acrylic acid or methacrylic acid with LSA salt using hydrogen peroxide. These copolymers are used as additives for the aqueous slurry of solid fuels (Japanese Kokai Sho-No. 61-218694).

There is however, no application of these copolymers as cement dispersants.

SUMMARY OF THE INVENTION

This invention provides a cement dispersant of a lignosulfonic acid graft copolymer, obtained by a redox free radical reaction of lignosulfonic acid or its salts with one or more acrylic or vinylic monomers containing functional groups, in an aqueous solution in the presence of a radical initiator, e.g., redox catalyst. The lignosulfonic acid graft copolymer has a molecular weight distribution of from $5 \times 10^2$ to $5 \times 10^6$.

The weight ratio of total monomers to lignosulfonic acid is from about 1:0.1 to 1:3.

When added to a cement composition the lignosulfonic acid graft copolymer imparts a high flowability to the cement composition without retarding the curing of the cement composition. The lignosulfonic acid graft copolymer has the capability of ensuring stabilized workability and the maintenance of flowability of a cement composition over a long period of time.

DESCRIPTION OF THE PREFERRED EMBODIMENTS

The lignosulfonic acid used for the preparation of the lignosulfonic acid graft copolymer may be generally obtained from sulfite pulp waste liquor, e.g., the residual solution obtained from fermenting broad leaf tree sulfite pulp waste (after removing the ethanol), hardwood lignosulfonic acid, herbal lignosulfonic acid, and sulfonated lignin from other than sulfite waste liquor.

The acrylic or vinylic monomers may include acrylamide, methacrylamide, 2-acrylamide-2-methylpropanesulfonic acid, methacrylamidoethylsulfonic acid, acrylic acid, methacrylic acid, methyl acrylate, methyl methacrylate, sulfoalkyl acrylate, acrylonitrile, methacrylonitrile, p-styrenesulfonic acid, and the like, and their alkali metal, salts, alkaline earth metal salts, ammonium salts and lower amine salts.

The functional groups of the acrylic or vinylic monomers may include carboamide, N-sulfoalkylcarboamide, carboxyl, carboalkoxy, carbosulfoalkoxy, cyano, and sulfophenyl groups.

In general, the lignosulfonic acid graft copolymer may be prepared by reaction the lignosulfonic acid with acrylic or vinylic monomer in the presence of a redox catalyst, e.g., a cerium salt; a ferrous salt, e.g., ferrous sulfate; a peroxide, e.g., hydrogen peroxide, t-butylhydroperoxide, cumene hydroperoxide, ammonium persulfate; or combinations thereof; or the like.

A preferred redox catalyst is a combination of a ferrous salt and a peroxide. A more preferred redox catalyst in ferrous sulfate and hydrogen peroxide.

The dosage is naturally dependent on the use intended of the cement composition, and whether or not other cement dispersants are used, e.g., naphtahalenesulfonateformaldehyde.

The dosage of the lignosulfonic acid graft copolymers of this invention in cement compositions, is from 0.1% to 3.0% solids with respect to the weight of the cement. This yields a cement composition slump of 21 cm or more with high flowability.

The copolymers are generally added to the cement compositions at the time of mixing the cement composition materials. However, the copolymers may be added after the mixing of the cement composition materials, or before the cement compositions are placed at a construction site.

In the examples the following materials are used for preparing the graft copolymers:
Calcium lignosulfonate (LSACa);
2-Acrylamide-2-methylpropanesulfonic acid (AS);
Acrylamide (AM);
Acrylic Acid (AA); and
Acrylonitrile (AN).
"%" means "% by weight", and
"part" means "part by weight".

The radical terminator used in Examples 1 and 3–6 was 1,1-diphenyl-2-picryl hydrazl.

The viscosity of a 25% solid solution of the reaction product of Examples 1–7 was determined by a "B" type (co-axial cylinder) viscometer (60 rpm) at 20° C.

Figure 1:
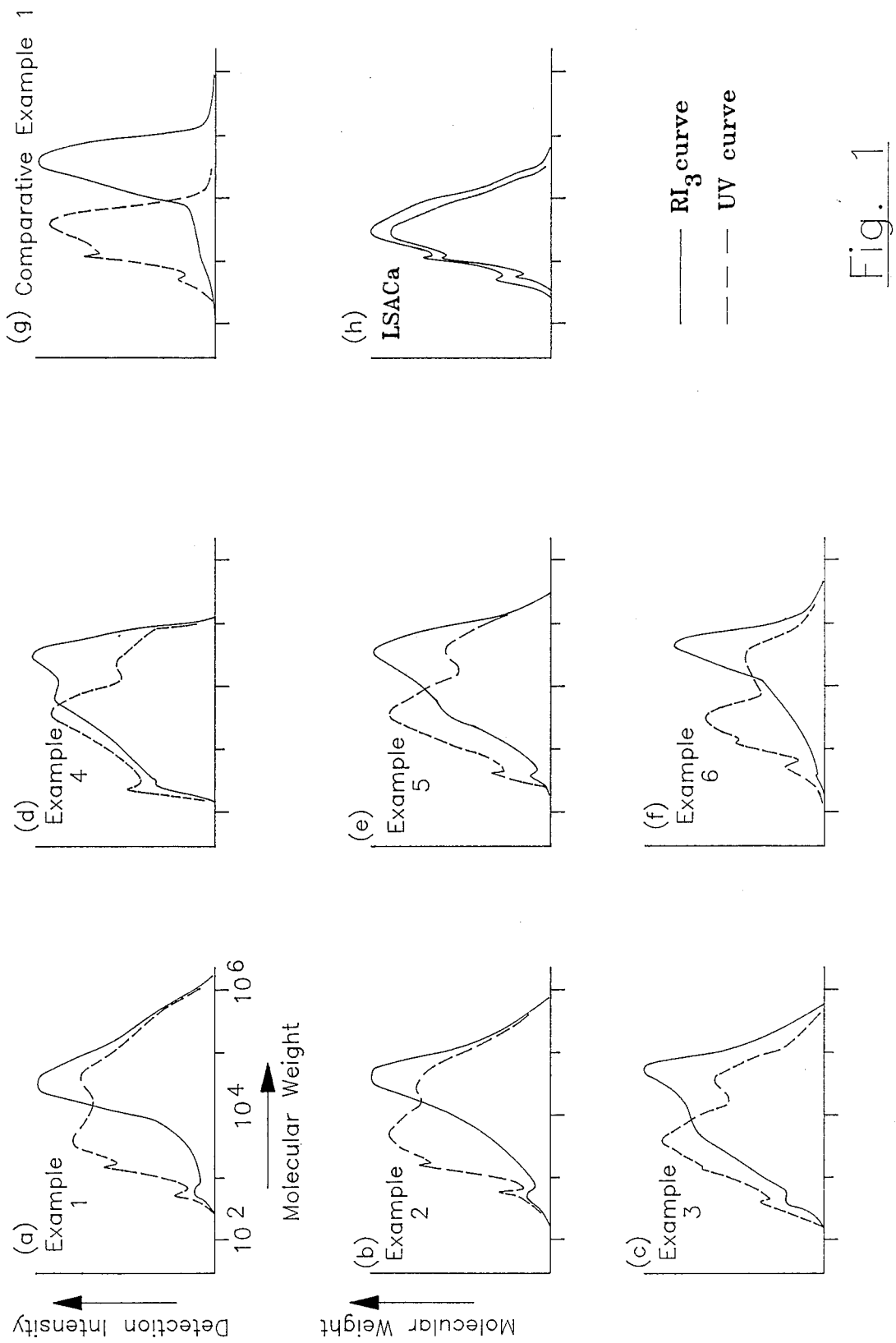
FIG. 1 shows a curve, as indicated by a solid line (RI curve), detected by a refractory index detector using the procedure of gel chromatography, of the reaction products and mixture obtained Examples 1–6 and Comparative Example 7. It also shows the molecular weight distribution condition of all of the test samples. A curve detected at a wavelength of 280 nm by means of an ultraviolet absorbance detector is indicated by a broken line (UV curve). This broken line indicates a molecular weight distribution of the lignosulfonic acid type substance alone in the test sample.

Detection intensity is plotted on the ordinate. Molecular weight is plotted on the abscissa.

EXAMPLE 1

While an aqueous brown solution of pH 7.0 comprising 107 parts of calcium lignosulfonate (LSACa), 127 part of 2-acrylamide-2-methylpropanesulfonic acid (AS), 391 parts of acrylamide (AM), 1800 parts of water, and 26 parts of caustic soda was mechanically stirred in a nitrogen atmosphere, it was heated to 50° C. by the addition of 10 parts of a 5% aqueous ferrous sulphate solution and 100 parts of 1% of aqueous hydrogen peroxide solution, which was added in portions over 30 minutes, with the reaction continuing at 50° C. for 4.5 hours. Then, after cooling, the reaction was stopped by radical terminator and was neutralized to pH 7.0 with 25% caustic soda, whereby 2400 parts of a brown viscous solution (25% solids) (viscosity 740 cps) was obtained.

The molecular weight distribution of the reaction product is shown in FIG. 1(a).

EXAMPLE 2

The reaction was carried out in like manner as in Example 1 by the addition of 3 parts of hydroquinone to an aqueous brown solution of pH 6.5 comprising 107 parts of LSACa, 127 parts AS, 391 parts of AM, 1800 parts of water, and 25 parts of caustic soda, whereby 2400 parts of brown viscous solution (25% solids)(viscosity 500 cps) was obtained. The molecular weight distribution condition of the reaction product is shown in FIG. 1(b).

EXAMPLE 3

While an aqueous brown solution of pH 2.0 comprising 315 parts of LSACa, 76 parts of AS, 229 parts of AM, and 1800 parts of water was mechanically stirred in a nitrogen atmosphere, 1 part of 5% aqueous ferrous sulfate solution was added. 50 parts of 1% aqueous hydrogen persulfate was added in portions at 20° C. over 5 minutes. The reaction was further continued at 20° C. for 5 hours and 55 minutes, whereupon it was stopped with a radical terminator, and was neutralized to pH 7.0 with 25% caustic soda, 2400 parts of a brown viscous solution (25% solids) (viscosity 170 cps) was obtained. The molecular weight distribution of the reaction product is shown in FIG. 1(c).

EXAMPLE 4

While an aqueous brown solution of pH 7.0 comprising 105 parts of LSACa, 159 parts of AS, 350 parts of acrylonitrile (AN), 1800 parts of water, and 16.5 parts of caustic soda was vigorously stirred mechanically in a nitrogen atmosphere, 10 parts of 5% aqueous ferrous sulfate solution was added. 50 parts of 1% aqueous hydrogen peroxide was added in portions at 20° C. over 30 minutes, the reaction was further continued for 4 hours and 30 minutes at 20° C. Thereafter, it was continued conducted in like manner as in Example 1, whereby 2400 parts of a brown viscous solution (25% solids) (viscosity 300 cps) was obtained. The molecular weight distribution of the reaction product is shown in FIG. 1(d).

EXAMPLE 5

While an aqueous brown solution of pH 4.0 comprising 103 parts of LSACa, 450 parts of AS, 23 parts of AM, 23 parts of acrylic acid (AA) was mechanically stirred in a nitrogen atmosphere, 5 parts of 5% aqueous ferrous sulfate solution was added. 25 parts of 1% aqueous hydrogen peroxide was added in portions at 20° C. over 10 minutes, the reaction was further continued at 20° C. for 4 hours and 50 minutes. After that, it was conducted in like manner as in Example 1, whereby 2400 parts of a brown viscous solution being (25% solids) (viscosity 500 cps) was obtained. The molecular weight distribution condition of the reaction product is shown in FIG. 1(e).

EXAMPLE 6

While an aqueous brown solution of pH 7.0 comprising 107 parts of LSACa, 508 parts of AS, 1800 parts of water, and 106 parts of caustic soda was mechanically stirred in a nitrogen atmosphere, 5 parts of 5% aqueous ferrous sulfate solution was added. 50 parts of 1% aqueous hydrogen peroxide was added in portions at 50° C. over 30 minutes. The reaction was further continued at 50° C. for 4 hours and 30 minutes. After that, it was conducted in like manner as in Example 1, whereby 2400 parts of a brown viscous solution (25% solids) (viscosity 700 cps) was obtained. The molecular weight distribution condition of the reaction product is shown in FIG. 1(f).

EXAMPLE 7

While an aqueous colorless clear solution of pH 7.0 comprising 127 parts of AS, 391 parts of AM, 1475 parts of water, 20 parts of methanol, and 25 parts of caustic soda was mechanically stirred in a nitrogen atmosphere, 10 parts of 5% aqueous ferrous sulfate solution was added, 50 parts of 1% hydrogen peroxide was added in portions at 5° C. for 4 hours and 50 minutes. The reaction was stopped with a radical terminator, whereupon 428 parts of 25% aqueous LSACa solution was added and it was neutralized to pH 7.0 with 25% caustic soda, whereby 2400 parts of a brown viscous solutions (25% solids) (viscosity 365 cpsss) was obtained. The molecular weight distribution condition of this product is shown in FIG. 1(g). The molecular weight as a whole is distributed in a higher region than that of lignosulfonate salt (IR curve), but its UV curve remains unchanged from (h), indicating that no change occurred in the lignosulfonate salt.

Examples 1-7 are summarized in Table 1.

TESTING OF EXAMPLES 1-7

The concrete compositions indicated in Table 2 were each weighed to make an 80 liter mixing batch. Each batch was immediately mixed for 3 minutes at 35 r.p.m. in a tilting mixer. Immediately after mixing samples from each batch were measured for slump and air content.

The mixers rotation was then lowered to 3 r.p.m. and each batch was mixed for 60 minutes. Samples from each batch were then measured for slump and air content.

All of the concrete batches were measured for 28 day compressive strength and setting time.

Also tested with the additives of Examples 1 to 7 were concretes obtained from adding beta-naphthalenesulfonic acid (BNSF) (comparative Example 8), and calcium lignosulfonate (LSACa) (comparative Example 9).

The results are shown in Table 3.

The procedures for measuring the slump, air content, compressive strength, setting time and the procedure for taking samples for compressive strength are based on the Japanese Industrial Standards (JIS A 6204).

The results from Table 3 comparing Examples 1-6 with Example 9 (calcium lignosulfonate) shown that the copolymers of this invention have:
1—greater slump with similar dosage;
2—less air entrainment;
3—minute slump loss after 60 minutes;
4—greater compressive strength at 28 days; and
5—shorter setting time.

Comparing Examples 1-6 with Example 8, sodium β-naphthalenesulfonate, (commercial high performance water reducing agent) shows the copolymers of this invention have:
1—higher slump; and
2—less slump loss after 60 minutes.

When calcium lignosulfonate is mixed with the copolymers of AS and AM (Example 7) the expected effects could not be obtained.

The cement dispersants of this invention show superior results over conventional high performance water reducing agents and mixtures of LSACa and the copolymer AS-AM.

TABLE 1

Lignosulfonic acid graft copolymer preparation

| | LSACa[1] (part) | Molar ratio of monomers used | | | | Initial pH | Initial Temperature (°C.) | Viscosity of reaction product solution (cps)[6] | Molecular weight distribution[7] | Remarks |
| --- | --- | --- | --- | --- | --- | --- | --- | --- | --- | --- |
| | | AS[2] | AM[3] | AA[4] | AN[5] | | | | | |
| Examples of the present invention | | | | | | | | | | |
| Example 1 | 20 | 1 | 9 | — | — | 7.0 | 50 | 740 | FIG. 1(a) | |
| Example 2 | 20 | 1 | 9 | — | — | 6.5 | 50 | 500 | (b) | Hydroquinone was added |
| Example 3 | 100 | 1 | 9 | — | — | 2.0 | 20 | 170 | (c) | |
| Example 4 | 20 | 1 | — | — | 9 | 7.0 | 20 | 300 | (d) | |
| Example 5 | 20 | 1 | 0.15 | 0.15 | — | 4.0 | 20 | 500 | (e) | |
| Example 6 | 20 | 1 | — | — | — | 7.0 | 50 | 700 | (f) | |
| Comparative Example 7 | 20 (mixture) | 1 | 9 | — | — | 7.0 | 5 | 365 | (g) | Methanol was added |

Note
[1]LSACa: Calcium lignosulfonate the amount added is in parts by weight with respect to 100 parts of monomer
[2]AS: 2-Acrylamide-2-methylpropanesulfonic acid
[3]AM: Acrylamide
[4]AA: Acrylic acid
[5]AN: Acrylonitrile
[6]Viscosity of the reaction product solution being 25% as solids at 20° C. by B type viscometer (60 r.p.m.)
[7]Indicates a molecular weight distribution prepared by calculations from the gel chromatography (refer to FIG. 1)

TABLE 2

| | | Concrete composition | | | | Amount of admixture added |
| --- | --- | --- | --- | --- | --- | --- |
| | | Unit amount (kg/m³) | | | | |
| Water/cement ratio (%) | Sand-coarse aggregate ratio (%) | Water | Cement | Fine aggregate | Coarse aggregate | |
| 50.6 | 48 | 162 | 320 | 876 | 950 | As indicated in Table 3 |

Cement: Ordinary portland cement
Fine aggregate: Land sand from the Ohi River  Specific gravity: 2.64  Finess modulus: 2.64
Coarse aggregate: Crashed stone from Ohme  Specific gravity: 2.64  Maximum particle diameter: 20 mm

TABLE 3

| | Cement dispersant | | Immediately after mixing | | After 60 minutes | | Compressive strength 28 days of Age (kg/cm²) | Setting time hours:minutes | |
| --- | --- | --- | --- | --- | --- | --- | --- | --- | --- |
| | | Dosage[1] (C × %) | Slump (cm) | Air content (volume %) | Slump (cm) | Air content (volume %) | | Initial | Final |
| Example 1 | Graft copolymer | 1.0 | 22.0 | 5.3 | 21.0 | 3.5 | 391 | 5:40 | 7:50 |
| Example 2 | Graft copolymer | 0.6 | 21.5 | 4.0 | 19.0 | 3.5 | 408 | 5:15 | 7:30 |
| Example 3 | Graft copolymer | 0.5 | 22.5 | 5.0 | 19.0 | 4.0 | 415 | 5:30 | 7:25 |
| Example 4 | Graft copolymer | 0.5 | 21.0 | 6.0 | 18.0 | 5.0 | 396 | 5:40 | 7:50 |
| Example 5 | Graft copolymer | 0.5 | 22.0 | 4.0 | 18.5 | 3.5 | 410 | 5:20 | 7:20 |
| Example 6 | Graft copolymer | 1.0 | 21.5 | 5.0 | 22.5 | 4.0 | 395 | 5:30 | 7:30 |
| Comparative Example 7 | Mixture | 0.5 | 5.0 | 4.5 | — | — | — | — | — |
| Comparative | BNSF[2] | 0.5 | 20.0 | 4.6 | 9.5 | 4.3 | 407 | 5:25 | 7:30 |

TABLE 3-continued

| | Cement dispersant | | Immediately after mixing | | After 60 minutes | | Compressive strength | Setting time hours:minutes | |
|---|---|---|---|---|---|---|---|---|---|
| | | Dosage[1] (C × %) | Slump (cm) | Air content (volume %) | Slump (cm) | Air content (volume %) | 28 days of Age (kg/cm$^2$) | Initial | Final |
| Example 8 Comparative Example 9 | LSACa | 0.5 | 18.0 | 8.1 | 12.0 | 7.5 | 372 | 5:35 | 9:50 |

Note
[1] % of solids to cement by weight
[2] BNSF: MIGHTY 150 (a product of Kao Kabushiki Kaisha) sodium β-naphthalenesulfonate

We claim:

1. A cement dispersant comprising a lignosulfonic graft copolymer of lignosulfonic acid or its salt and at least one acrylic or vinylic monomer, the monomer having functional groups comprising carboamide, N-sulfoalkylcarboamide, carboxyl, carboalkoxy, carbosulfoalkoxy, cyano, and sulfophenyl groups, with the lignosulfonic acid graft polymer having a molecular weight distribution of from $5 \times 10^2$ to $5 \times 10^6$.

2. The cement dispersant according to claim 1 wherein the acrylic and vinylic monomers are selected from the groups consisting of acrylamide, methacrylamide, 2-acrylamide-2-methylpropanesulfonic acid, methacrylamidoethylsulfonic acid, acrylic acid, methacrylic acid, methyl acrylate, methyl methacrylate, sulfoalkyl acrylate, acrylonitrile, methacrylonitrile, and p-styrenesulfonic acid.

3. The cement dispersant according to claim 2 in which the salt of the lignosulfonic acid graft copolymer is an alkali metal salt, alkali earth metal salt, ammonium salt, or lower amine salt.

4. A method of increasing the flowability of cement compositions which comprises adding to the cement compositions from about 0.1% to 3.0% based on the weight of the cement of a cement dispersant of claim 1.

* * * * *